Oct. 21, 1969    R. J. McGEE ET AL    3,474,342
SIGNAL TRANSLATION SYSTEM
Filed July 8, 1966    3 Sheets-Sheet 1

WITNESSES:
Bernard R. Gieguex
James F. Young

INVENTORS
Roger J. McGee &
Ralph J. Metz.
BY
John L. Wagreff 3,474,342
SIGNAL TRANSLATION SYSTEM
Roger J. McGee, Laurel, and Ralph J. Metz, Ellicott City, Md., assignors to Westinghouse Electric Corporation, Pittsburgh, Pa., a corporation of Pennsylvania
Filed July 8, 1966, Ser. No. 563,830
Int. Cl. H04b 1/10
U.S. Cl. 325—473                      8 Claims

ABSTRACT OF THE DISCLOSURE

The detection of signals in a power spectrum is materially aided by reducing the bandwidth which is accomplished by passing the spectrum through a large number of contiguous narrow bandwidth filters. The dissected spectrum is detected, integrated and used selectively in a feedback circuit to generate center frequencies which fall within the respective bandwidth of each filter channel thereby eliminating false channel identification.

---

This invention relates to a signal translation system and more particularly to improvements in a signal translation system for retrieving information signal data dispersed in a wide spectrum of signal frequencies, including noise and other frequencies of random phase and amplitude.

Although the invention is illustrated in connection with a system for retrieving pulse Doppler radar signal data from the Doppler echo power spectrum of a radar receiver, the invention is not so limited. Its adaptability to other signal translation systems will be apparent to those skilled in the art.

In coherent radar systems utilizing the Doppler shift phenomena, the shift in frequency of the received signal is proportional to the radial velocity between the transmitting source and the target and if suitably measurable will become a source of information about a particular target parameter, such as range rate, which is the radial velocity between the radar and the target. In such systems it is conventional to quantize the power spectrum of the echo signals along radial and angular coordinates. The angular quantization is a function of the antenna, while the quantization of the radial coordinates must take place within the confines of an individual angular quantum.

Detection of signals in a power spectrum, including random noise, such as is introduced by all practical antennae and receivers, is materially aided by reducing the bandwidth through which the corrupted signal, that is, the received signal plus noise, passes before a detection decision is made. It has been found that the Doppler shift in frequency of a radar echo signal is measurable to a satisfactory degree of resolution by using a large number of contiguous narrow bandwidth filters constituting fixed band of channels covering the range of the Doppler shift frequency information which is of significance. The continum of values of frequency may be quantized such that the bandwidth of one of the frequency channels is one quantum. This frequency channelizing coincides with the bandwidth reduction made necessary, or desirable, by the requirements of signal detection. Accordingly, pulse Doppler radar apparatus frequently employs a receiver system which is a multichannel system in which the Doppler frequency resolution is carried out by a bank of contiguous frequency filters in each channel. The output of the individual frequency filters is then examined by means of some high speed method of sequential interrogation.

The pulse Doppler radar environment is chosen for the purpose of illustrating the present invention because it illustrates the "two-dimensional" aspect, namely, the "scooping-up" of the signal power from a band in the frequency spectrum. In this two-dimensional aspect the bandwidth of a signal channel becomes one dimension and time becomes the other. In other words, the signal power is frequency quantized and time quantized. Although it is common to talk in terms of a single frequency, as a matter of fact the intelligence or information in the signal power is always distributed among a spectrum of frequencies constituting a power spectrum. This power spectrum is then dissected by the channels of the filter bank, detected and integrated, and the integrated signal from each channel is used selectively to cause to be generated AC signals corresponding, respectively, to center frequencies of each filter channel.

The filter bank is a combination of contiguous narrow bandpass filter channels each of which is periodically "looked-at" or interrogated for a short period of time during an interrogation process which examines all of the channels sequentially to determine the amount of signal power in each channel. The signal power of each channel is placed on a bus which is connected to a threshold detector. If the amplitude energy in any interrogated channel exceeds the predetermined threshold of the threshold detector, a detection is said to take place and further interrogation of the crystal filter bank channels is temporarily stopped. It is conventional in this type of system to have each channel of the filter bank include a crystal, a detector and an integrator unit. The function of the integrator is to store any energy that may pass through its associated crystal filter. In the channel where a detection has been made it is necesary to generate a center frequency which represents the signal intelligence; that is, the frequency associated with the channel where the detection was made, and this center frequency must be supplied to further apparatus in the system for further processing.

Heretofore, in apparatus for processing the signal intelligence from each of the channels it was necessary to generate a DC signal representing the position of the filter in the bank. This further necessitated digital-to-analog conversion apparatus in order to utilize the signal intelligence. It is here that this present invention departs from the prior art. Instead of the components of the prior art for generating DC voltages representing the position of each channel, and performing the digital-to-analog conversion to derive signals which are analogs of frequencies, the components of the respective channels, including the Doppler amplifier and the filter crystals constitute respecsive crystal-controlled frequency generators which generate frequencies which are the respective center frequencies of the respective channels. The Doppler amplifier DA is sequentially and selectively coupled into an oscillator configuration with a filter channel which receives a signal above a selected threshold. Therefore, the generated frequencies must fall clearly within the respective bandwidths of the selected filter channels and no false channel identification is possible.

Comparison of FIGS. 1 and 2, illustrating, respectively, the basic components of the prior art and of the present invention, emphasizes pointedly the difference between the two systems. It will be noted that in the prior art system of FIG. 1, the threshold detector TD, in addition to controlling the interrogator 12, also controls a digital-to-analog converter, the output of which is a DC analog voltage representing the center frequency of the channel which receives a signal above the selected threshold value.

The digital-to-analog conversion of the prior art utilizes a complex and critical circuitry. Therefore, it is extremely difficult to mechanize since each channel has a very narrow bandwidth and any error or small drift in the conversion would not identify the selected channel but would provide false information indicating that it was an adjacent channel.

It is a primary object of the present invention to provide an improved signal translation system for deriving signal intelligence from a relatively wide spectrum of frequencies in which signal intelligence is included.

Another object is to provide an improved signal translation system for deriving the center frequency of a selected band of frequencies which will be accurate, will have greater reliability and will be simple and inexpensive to manufacture.

Another object is to provide an improved signal translation system having a plurality of contiguous channels in which means is provided for selectively generating signals representing the center frequency of the respective channels for as long as desired.

Another object to provide an improved signal translation system having a plurality of contiguous channels in which the means for quantizing the center frequency is the filter crystal and its associated amplifier plus means for automatically connecting the crystal and amplifier into an oscillator configuration for generating the center frequency of the filter in response to a signal of selected threshold amplitude.

The invention itself, however, both as to its organization and method of operation as well as additional objects and advantages will best be understood from the following description when read in connection with the accompanying drawing, in which:

FIG. 5 is an enlarged isometric view of a special transformer unit Biax capable of operating as a linear transformer whose polarity is dependent upon the direction of selected remanent flux; and FIG. 6 is a graphical representation of the phase of the outputs of the channel in which there is a detected signal and the channels on either side.

Broadly speaking, the present invention comprises a frequency spectrum analyzer in the form of a contiguous filter bank comprising a plurality of contiguous filter channels; each of the contiguous filter channels having a filter crystal whose center frequency determines the center frequency of its respective channel and a cascaded broad band amplifier whose band covers the spectrum being analyzed, together with automatic means responsive to a signal within the sequentially scanned channels for disconnecting the signal input from the broad band amplifier and connecting the broad band amplifier and the crystal of the selected channel in a oscillator configuration so that the channel is switched from operation as a passive filter circuit to operation as an oscillator thus providing a synthetic information signal of substantially fixed amplitude accurately representing the center frequency of the selected channel.

The invention is illustrated as applied to a Doppler radar system in which a bank of contiguous filter channels quantizes segments of the Doppler echo spectrum of the radar receiver. The input signal is the broad band Doppler echo spectrum.

In copending patent application Ser. No. 64,372 filed Oct. 24, 1960, in the name of Normal L. Weinberg and Ralph J. Metz for Signal Data Extraction Circuit and Method Employing Magnetic and Other Solid State Devices, owned by the assignee of this application, and in copending patent application Ser. No. 360,050, filed Apr. 14, 1964, in the name of Irving I. Kaplan and Joseph G. Nay, for Signal Translation System, also owned by the assignee of this application, there is described and claimed a signal data retrieval system in which the present invention could be utilized. Accordingly, minimum details of the overall system will be described, touching only on such aspects as will make the present invention completely understandable to one skilled in the art.

In these prior systems, as well as in the present one, the received Doppler frequency spectrum is separated into discrete segments by means of narrow bandpass filters having bandwidths commensurate with the range rate resolution desired. These bandpass filters perform the function of frequency quantization and pre-detection filtering. The basic target information in a Doppler radar system is relative velocity, that is, range rate, and the signal supplied to the filters may be fed from one of a number of range gated receivers.

Figure 1:
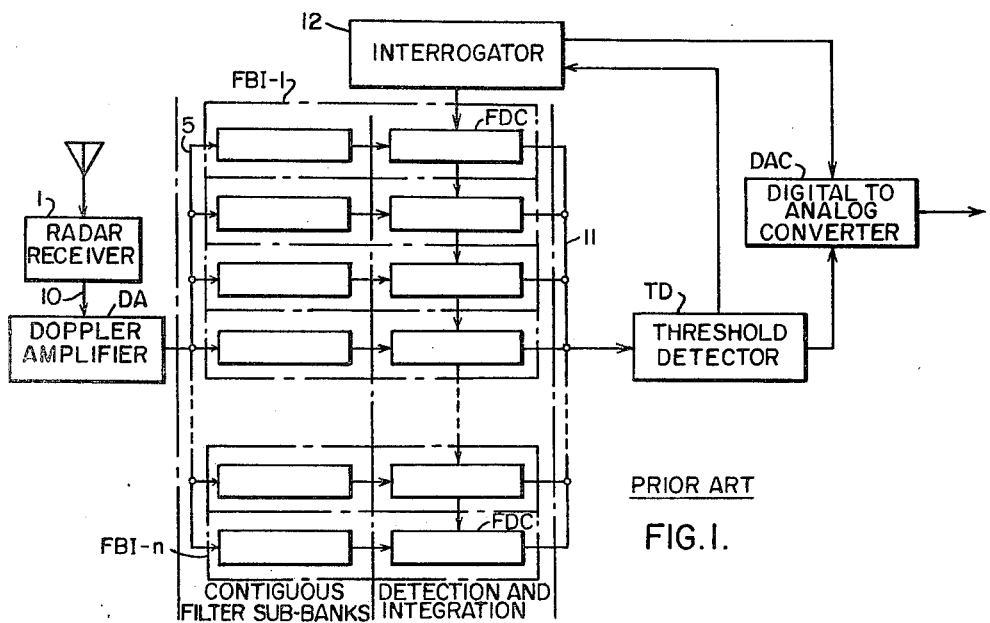
FIGURE 1 is a circuit diagram of the basic components of a system of the prior art over which the present invention is an improvement.
Figure 2:
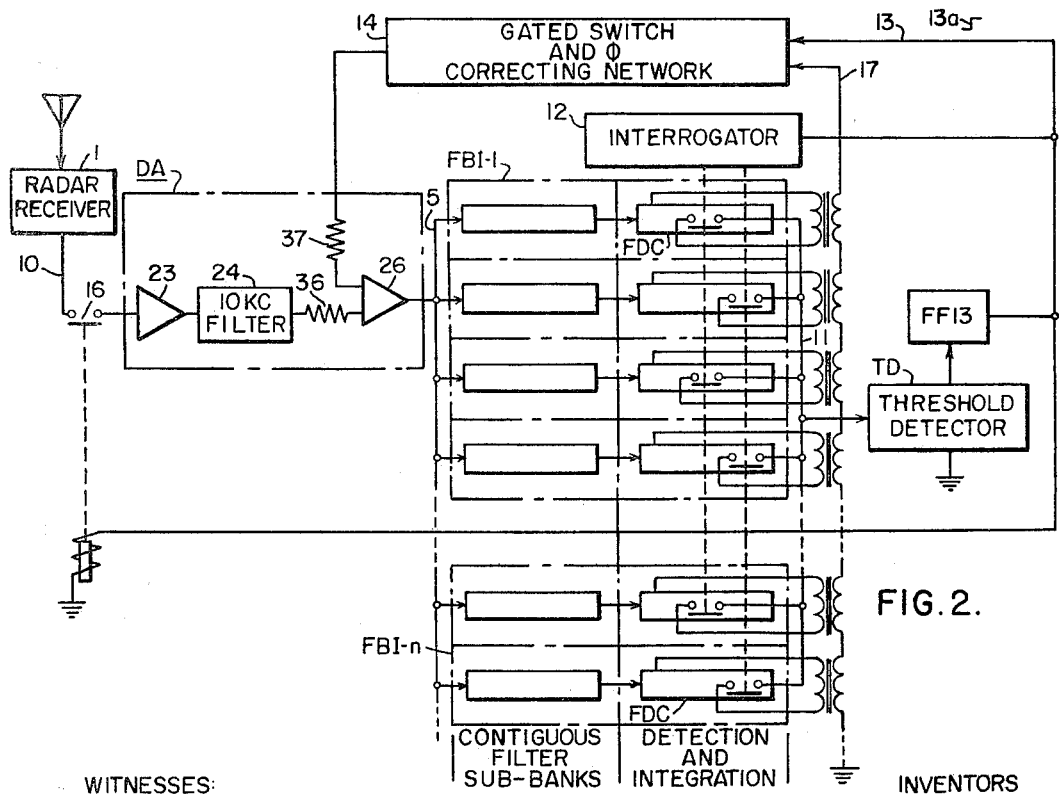
FIG. 2 is a skeletonized schematic block diagram of the basic components of a system in accordance with the present invention.

The contiguous frequency channels which constitute the filter bank are a part of what may be called filter bank and interrogator units, hereinafter referred to as FBI units, a plurality of which are illustrated in FIG. 1 and FIG. 2. These frequency channels include filter detection units commonly called FDC units, each having a demodulator, integrator means and read-out means, the latter being responsive to periodic interrogation signals. A quantized portion of the Doppler frequency spectrum is filtered, demodulated and integrated in each channel. After a suitable integration time, the integrated information in each channel is sampled, and the amplitude of this value is used to make a YES-NO decision. The amplitude sampling occurs during the time interval during which the signal power in the FDC is being integrated and stored between read-out intervals. The target detection decision for each channel is determined by a measurement of the integrated demodulated envelope of the frequency modulated signals appearing in the frequency quantized channels, the center frequency of which, so to speak, labels the frequency output Doppler signal data. The integrated signal power plus the noise power in each FDC is compared with a threshold reference voltage for making the target detection decisions.

The features so far described are common to the prior art, indicated in FIG. 1, and the system in accordance with the present invention, indicated in FIG. 2. The distinction between the prior art and the present invention can be quickly sensed by a comparison of the block diagrams of FIG. 1 and FIG. 2. In general, the signal power spectrum may be derived from any conventional radar receiver 1, the output of which is indicated at 10 and is supplied to the input of the Doppler amplifier indicated by the block DA. The output of this Doppler amplifier block is supplied to a bus bar 5 to which all of the inputs of the filter channels or FBI units are connected. Each of the outputs of the FDC units in the frequency channels is connected through a normally open electronic switch to a common output bus bar 11 which constitutes the input to a threshold detector unit TD. The threshold detector, through a conventional flip-flop or step pulse generator FF-13, initiates a step pulse signal 13a over conductor 13 to a gated switch and phase correcting unit 14, an interrogator unit 12 for sequentially sampling the signals in the channels, and an isolating switch 16. The coordinate action of these components stops the scanning of the FDC units, isolates the radar receiver from the Doppler amplifier and changes the circuit configuration of the channel in which a threshold signal appears from that of a passive amplifier to that of an oscillator operating at the frequency of its crystal. On the other hand, in the prior art, (FIG. 1) the operation is exactly the same up to and including the generation of the step pulse signal 13a but in the prior art the output of the threshold detector causes the generation of a signal in the interrogator which identifies the channel in which a threshold signal is found. Also, the output of the threshold detector controls the digital-to-analog converter which the present invention does not have.

In the present invention the transfer of operation of the channels from amplifier to oscillator operation is facilitated in a unique manner by Biax transformer units 20 hereinafter identified and described in more detail, which are capable of maintaining an AC coupling that can be shifted in phase by 180°.

The gated switch unit 14 alternatively selectively shorts to ground or directs the output of the Biax units to the input of the amplifier DA to selectively control the change of the passive filter operation of the FDC units to active oscillator operation.

The term Biax is a registered trademark of the Ford Motor Company and the item sold under that name is a square loop core having non-intersecting orthogonal apertures about which orthogonal magnetic fields may be established. These cores were designed for use as logic and memory elements for digital computers. The components utilized in accordance with the present invention and designated herein as Biax units 20 are utilized as special linear transformers in which the phase between the input and output can be switched from in phase to 180° out of phase. These Biax units are fabricated from cores manufactured by the Ferroxcube Corporation of America of Saugerties, N.Y., and designated as BX2 and described in their bulletin form No. BX-261.

The cores of these Biax units have non-destructive read-out characteristics. The major loop crosses the H-axis at substantially right angles so that the material has only two possible remanent flux states, namely, positive and negative, while at the same time being capable of operating as a linear transformer. The polarity of the transformer is dependent upon the state of the remanent flux. In other words, the phase of the output can be reversed by a reversal of the remanent flux. As the description proceeds it will be seen how the output of the FDC's are coupled through this transformer action to the input of the amplifier DA and the direction of the remanent flux determines whether it is degenerative or regenerative feedback. All the FDC's are inductively coupled to the Biax sense lead 17 at all times either in the degenerative or regenerative phase. Each is coupled in degenerative phase at all times when the channel in which the unit is located is not being "looked at" or sampled. Then if its output equals, or exceeds, the selected threshold value the phase of its output is shifted by 180° to put it in regenerative phase. Simultaneously, the step pulse 13a on conductor 13 causes the Doppler amplifier to be decoupled from the signal input 10 and to be coupled to the output of the channel to be coupled to the input of the Doppler amplifier, thus putting the sampled channel in oscillator configuration with the Doppler amplifier. It remains in this oscillating condition until a command signal CS-13 is supplied to one of the inputs of the flip-flop FF-13 to cancel the step pulse on lead 13. It should be pointed out here that as illustrated in this embodiment the transition from degenerative to regenerative configuration is in two steps; first, the phase of the inductive coupling in the Biax units is reversed in response to a scanning pulse from the interrogator 12 and then almost simultaneously if there is a threshold signal in the channel, the step pulse signal 13a on lead 13, initiated by the threshold detector TD, causes the Doppler amplifier DA to be disconnected from the radar signal input 10 and the lead 17 to be coupled to the input of the Doppler amplifier.

The heart of the system of the present invention, vividly contrasted with the prior art represented in FIG. 1, is in the cooperative relation between the Biax units 20, the gated switch and phase correcting network 14, the Doppler amplifier DA and the FDC units. In this cooperative relation the integrated outputs of the FDC's are sequentially sampled and the FDC which has an output above the predetermined threshold level is switched to an oscillator configuration as explained immediately above, so that the crystal of a particular channel which previously served as a filter amplifier becomes part of an oscillator at the same frequency.

Figure 3:
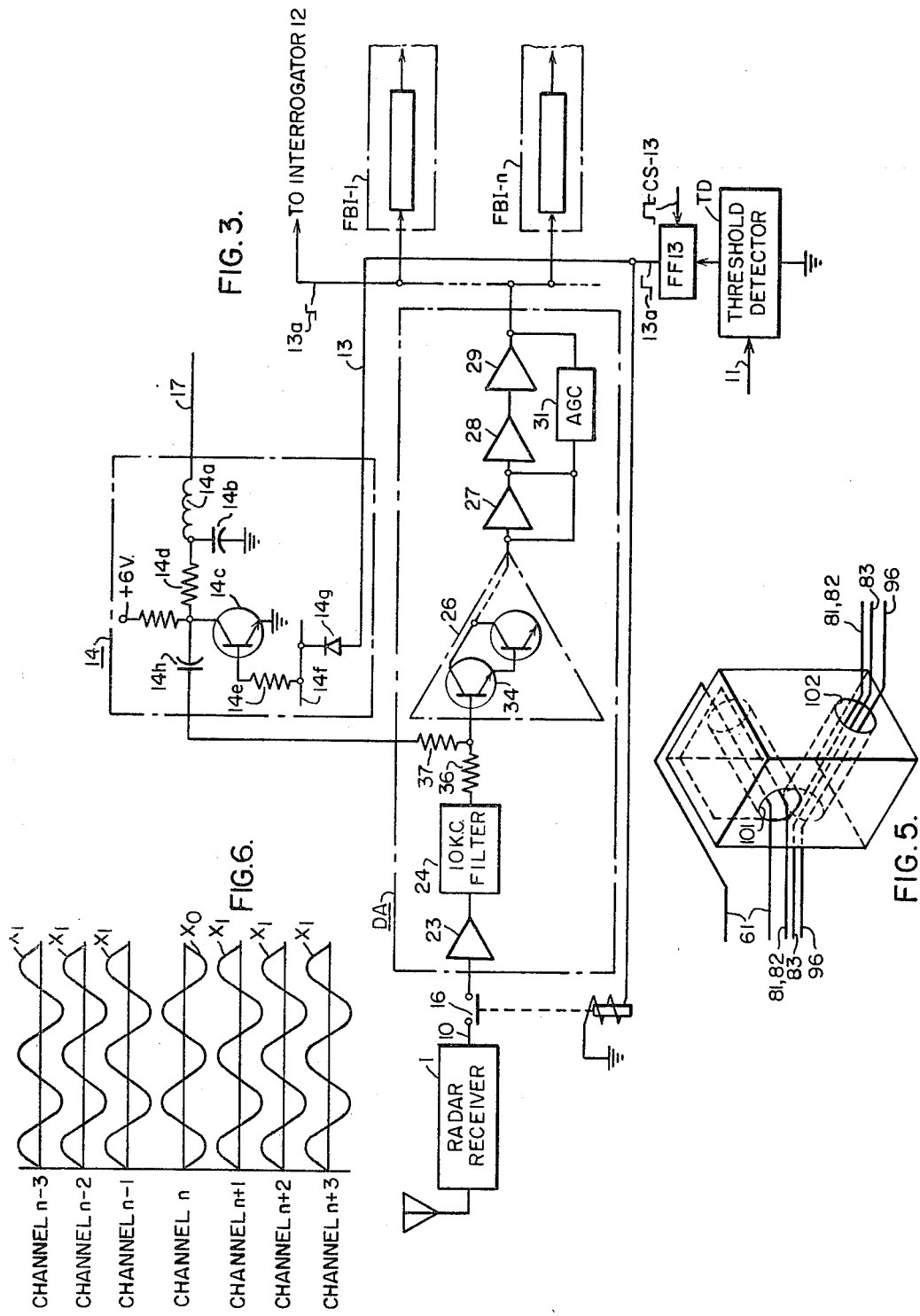
FIG. 3 is a circuit diagram of the details of filter channel $n$, plus such portions of channel $n-1$, plus such other portions of the circuitry as are necessary to illustrate the operation of the invention.

Referring to FIG. 3, the gated switch and phase correcting network unit 14 includes an inductance 14a and a capacitor 14b constituting a relatively low "Q" broad band input coupling circuit between the sensing lead 17 of the Biax units 20 and the Doppler amplifier unit DA.

The gated switch is a grounded emitter transistor 14c, the collector of which is connected to the junction between the inductance and capacitor through a coupling resistor 14d of approximately two thousand ohms. The base of the transistor is connected through a resistor 14e to a common bus 14f of an AND circuit, the only branch of which concerns the present invention is that including the diode 14g through which the lead 13 is connected to the base of the transistor switch. The collector of the transistor is connected through a suitable load resistor to the positive side of a source of DC potential indicated by the terminal +6 v. It can be seen at a glance that with a suitable positive potential on the base of the transistor switch 14c the latter is closed and the collector of the transistor is shorted to ground, effectively, opening the feedback loop. With zero potential on the base of the transistor the transistor switch opens and the AC signals on the Biax sense line 17 will be supplied through the coupling capacitor 14h to the high value resistor 37 and to the input of the amplifier 26 which is one of the amplifier stages of the Doppler amplifier DA.

The Doppler amplifier DA may include a suitable buffer amplifier 23 and a suitable filter 24 which is designed to have a broadband to cover the total bandwidth of all of the FDC units. In addition, thereto, this unit may have any additional desired number of cascaded broadband amplifier stages, four being shown at 26, 27, 28 and 29. The output of these stages is connected to the bus bar 5 to which the inputs of all the FBI units are connected. The two intermediate amplifier units 27 and 28 are provided with suitable AGC input control by means of an AGC unit 31 connected between the output of amplifier stage 29 and the inputs to the amplifiers 27 and 28. The radar data input lead 10 is connected through the relay switch 16 to the front end of the Doppler amplifier DA. The switch 16 is designed to open in response to the positive step pulse 13a on the lead 13 that also simultaneously opens the transistor switch 14c and permits the signals on lead 17 to be supplied to the amplifier 26. The input stage 34 of the amplifier 26 is illustrated as being a Darlington transistor configuration which has a very high input impedance. The resistors 36 and 37 have high resistance values to provide impedance matching and isolation. It is apparent from the foregoing description and drawings that when the Doppler amplifier DA is operating with the FBI units as part of an open loop signal channel its input is through the resistor 36 and when it is operating as part of a closed loop oscillator configuration its input is through the resistor 37.

Figure 4:
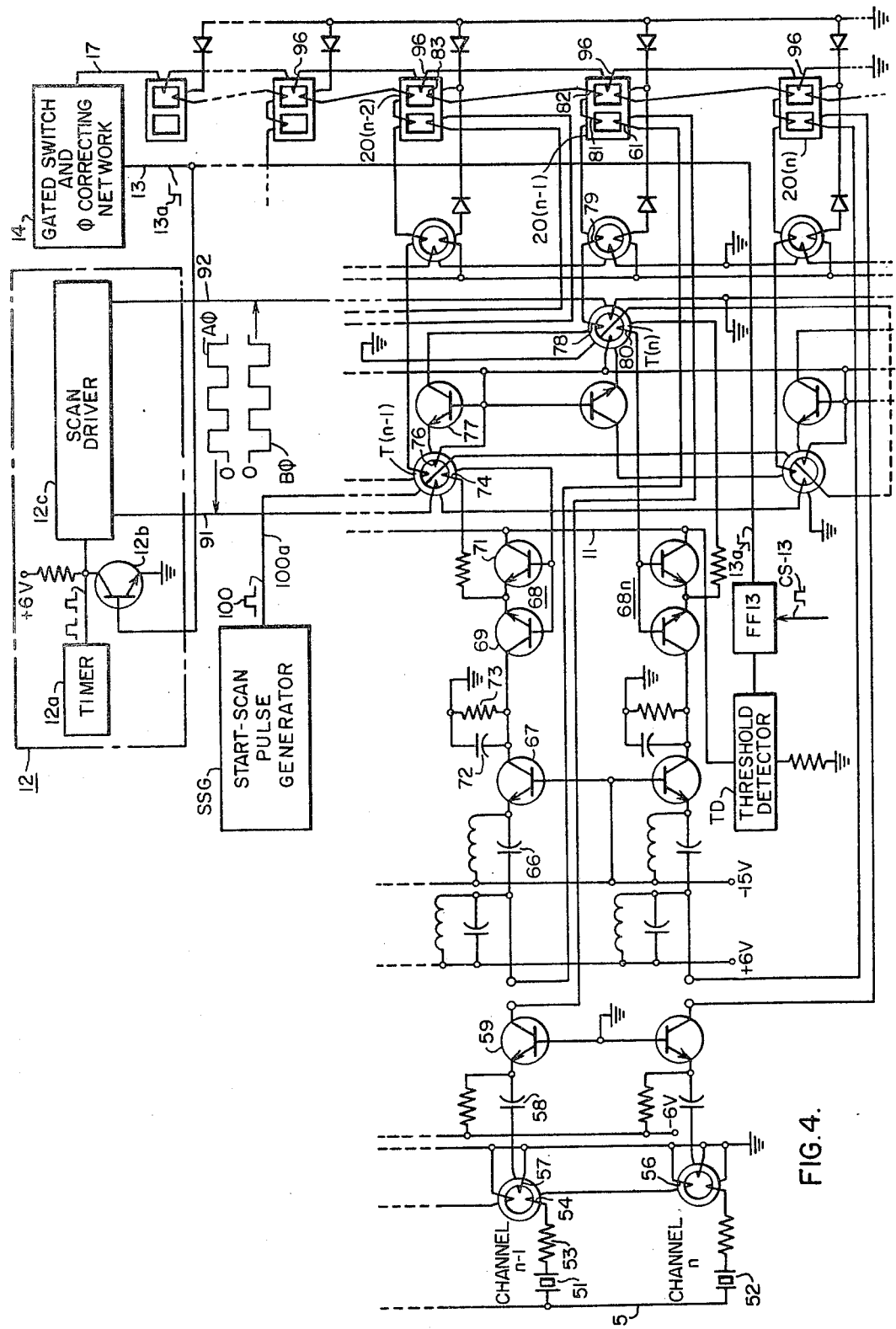
FIG. 4 is a block circuit diagram of the Doppler amplifier and switching arrangement showing how the respective filter crystals and the Doppler amplifier is caused to change operation from that of a filter channel to that of a generator of frequencies representing the respective center channel frequencies.

In FIG. 4 is shown the details of FBI units $n-1$ and $n$ and only so much of the complete circuit diagram as are necessary to illustrate the sequential scanning interrogation, detection and oscillator functions of the FBI units. It has previously been indicated that the FBI units each comprise a narrow bandpass filter, including the filter crystal which quantizes a given band of frequencies, and the FDC units which detect and store any signal energy that may pass within its band limits. The interrogation and read-out process, during which each FDC is sequentially "looked-at," or sampled, for a short time to determine the amount of signal energy stored in the integrators of the individual channels, has been discussed above. The demodulated output from each FDC is supplied sequentially to the common output bus bar 11 which is connected to the input of the threshold detector TD. If the voltage of an interrogated FDC exceeds a predetermined threshold reference level, a detection takes place, a positive output step pulse 13a is supplied to lead 13 to the interrogator unit 12, the gated switch unit 14 and the relay switch 16. At the same time that the pulse 13a opens the relay switch 16 and the transistor switch 14c, thus providing a closed feedback loop between the FDC units and the amplifier units 26, 27, 28 and 29 it also closes the transistor switch 12b in the interrogator unit to temporarily stop the scanning. The particular FDC unit in which a threshold signal appears will be coupled in regenerative phase while all the other FDC's remain coupled in degenerative phase. This causes the regeneratively coupled FDC unit to function as a part of the closed loop oscillator configuration to generate a frequency which is the same as the frequency at which it served previously as a filter.

Continuing particular reference to FIG. 4, it will be seen that the FDC units are arranged so that each crystal is shared between two adjacent channels. Since all the channels are identical it is necessary to describe only one in detail. However, since each channel cannot be an isolated unit and is a part of an interrogator matrix, FBI channel units $n-1$ and $n$ are shown complete together with so much of other circuitry as is essential to describe the operation of the invention. Since each FBI unit includes the FDC unit as a part of the interrogator matrix, the complete description for one FBI unit will suffice, it being understood that this is illustrative of the other units.

The crystals 51 and 52 each mutually share the two channels $n-1$ and $n$. The crystal 51 is connected between the channel input bus bar 5 and a suitable isolating resistor 53 in a series circuit including winding 54 of a transformer for channel $n-1$ and a winding 56 of a transformer for channel $n$, the other end of the winding 56 being connected to ground. The circuit for channel $n-1$ includes winding 57, coupling capacitor 58, a grounded base transistor 59 and a drive winding 61 of a Biax unit 20($n-1$). The winding 61 is a part of the inductive coupling between the channel and the sense winding lead 17. The FDC portion of the channel includes a second coupling capacitor 66, a second common base transistor 67, and a single pole electronic switch unit 68, which includes two common base transistors 69 and 71 and a lead to the common output bus bar 11 over which a signal is carried to the threshold detector TD. The common base transistor 67 is the signal detector and between its collector and ground there is connected an RC signal interrogator network including the capacitor 72 and the resistor 73. In the threshold detector TD the signal appearing on the output bus bar 11 is compared with a threshold DC reference voltage and if it is equal to or above the threshold level the positive step control signal pulse 13a is supplied over the lead 13.

The interrogator matrix portion of the channel includes a winding 74 of transformer T($n-1$) in the emitter-base circuits of the two transistors 69 and 71, the winding 74 being inductively coupled to winding 76 which is in a circuit including a common base transistor 77, wnding 78 of transformer T($n$), transformer winding 79, two windings 81 and 82 of the Biax unit 20($n-1$) and winding 83 of a second Biax unit 20($n-2$) in the previous adjacent channel $n-2$ which is the last channel sampled prior to channel $n-1$. The Biax unit 20($n-2$) is returned to the remanent set state for degenerative coupling at the same time that channel $n-1$ is sampled. The interrogator unit 12 includes a timer 12a which supplies clock pulses through an electronic "stop-scan" switch 12b to a scan driver 12c. The switch 12b is controlled by the control pulses on lead 13 which are supplied by the flip-flop FF-13 which in turn is under the joint control of the detection decision output pulse from the threshold detector TD and a command signal pulse CS-13 supplied from equipment not shown but with which the present invention may be used. For example, an output pulse from the threshold detector TD causes the flip-flop FF-13 to generate the positive-going step pulse 13a on lead 13 which is supplied to the unit 14 and the "stop-scan" switch 12b of the interrogator unit. The step pulse signal 13a remains on lead 13 until the command signal CS-13 resets the flip-flop FF-13 to its other condition of zero output.

In response to clock pulses the scan driver unit 12c generates two sets of pulses designated as A-phase and B-phase, repectively, shown in the graph in FIG. 3. Each set has a duty cycle of approximately 50% and the pulses of one set are chronologically spaced between the other set so that when there is an A pulse there is no B pulse, and vice versa. The A-phase signals are supplied to a conductor 91, which is inductively coupled to a transformer for alternate channels corresponding to transformer T($n-1$). The B-phase signals are supplied to conductor 92 which is inductively coupled to a transformer for the intermediate channel corresponding to transformer T($n$).

In response to A-phase signals the induced pulse in winding 74 of transformer T($n-1$) closes the electronic switch 68, connecting the channel output to bus bar 11, and a pulse from winding 76 supplies the setting pulse to the Biax unit 20($n-1$) in the remanent state for inductively coupling the output of channel $n-1$ to the sense winding 96 and the lead 17 in regenerative phase. A pulse induced in winding 80 of the transformer T($n$), in response to B-phase pulses closes the electronic switch 68$n$ to subsequently connect the signal output of channel $n$ to the bus bar 11. It is the electronic switches in each channel corresponding to switches 68 and 68$n$ which sequentially connect the respective alternate channels to the output signal bus bar 11 so that the threshold detecor TD can sample and compare the signal which is stored in the signal integrator circuits corresponding to the integrator circuit 72, 73 of channel $n-1$ and determine whether or not a detection decision should be made.

The scanning of the interrogation matrix is produced by alternate A-phase pulses, which induce pulses in the windings of transformers corresponding to transformer T($n-1$) and by the intermediate alternate B-phase pulses which induce pulses in the windings of the intermediate alternate transformers corresponding to transformer T($n$). The inductive coupling between the two sets of transformers causes the set and reset states to step transversely in zig-zag fashion in FIG. 3 from channel to channel. All of the sense windings 96 of the Biax units 20($n$), 20($n-1$), 20($n-2$) etc., are connected in a series circuit with the lead 17, but as previously mentioned, only the signals from a channel having a signal voltage above threshold will be phased properly for regenerative feedback to the Doppler amplifier DA to provide the oscillator configuration for the threshold channel.

Whereas the interrogator 12 supplies A-phase and B-phase pulses alternately to the vertical rows of transformers T($n-$) and T($n$), to cause the set and reset remanent states in the Biax units to step in zig-zag fashion vertically of the interrogation matrix, means must be provided to start the scanning cycle each time a scanning cycle is completed. To this end, a clear pulse, such as the start-scan pulse 100 is supplied over line 100a which may be connected in a series circuit with a winding on each of the transformers T($n-1$) and T($n$) in the matrix and ground G. In this instance the windings are so connected that one of them, say the one in the first channel would be in the set state while all others are in the reset state.

The pulses may be generated by any suitable square wave generator SSG which preferably supplies pulses spaced in time not less than the scanning cycle period. Although reference is made above to an "interrogation matrix" the operation is more in the nature of a step register.

As illustrated, where the pulses 100 are supplied to each transformer to provide completely automatic operation a suitable pulse derived from the flux setting signal for the transformer corresponding to the transformer T(n) in the nth channel could be fed back through appropriate flip-flops and an AND circuit to the switch 12b of the interrogator 12 to provide continuous recycling. If desired, the automatic feature can be dispensed with and the pulses 100 could be supplied only, for example, to the transformer corresponding to transformer T(n—1) in the first channel to reverse the flux to the set state so that in response to the pulses from the scan driver 12c the "step-register" operation cycle will start over again.

As previously indicated, the Biax units have square loop ferrite cores so that remanent flux can be latched in one position or the other in response to control signal pulses in the set windings. The units may be considered to be linear transformers whose polarity depends upon the direction of the remanent flux. In other words, AC signals from the output of the channels supplied to the drive windings 61 will induce voltages in the sense windings 96 which will have one polarity for one direction of remanent flux and the opposite polarity for the opposite direction of remanent flux. Their remanent state memory is not affected by the AC signals.

The ferrite cores of the Biax units have orthogonal apertures such as the interrogate aperture indicated at 101 and the sense aperture 102 in FIG. 5. Drive winding 61 is in aperture 101 only while set windings 81 and 82 extend through apertures 101 and 102. Reset winding 83 and sense winding 96 are in aperture 102 only.

The philosophy of operation of the Biax element is that of flux interference which occurs in the volume of the magnetic material located between the two orthogonal apertures 101 and 102. Since the two apertures do not intersect, the flux linking each aperture must share the common volume of ferrite material between the apertures.

The distance between the two apertures and the outer wall thickness are so proportioned that complete magnetic saturation around a given aperture can be achieved only if a majority of the domains in the common volume are favorably oriented. The cross-sectional area of the outer walls of both apertures is about equal to the cross-sectional area of the common volume of ferrite material between the apertures. Assuming some magnitude of flux linking both apertures, an increase of magnetic flux created by an increased magnitude of current in a wire linking this aperture to complete saturation about that aperture will produce complete saturation of the common volume of the ferrite between the apertures in one direction about this aperture. This then leaves zero flux linking the other aperture through the common volume. This condition requires that the flux that originally closed about the aperture through the common volume, to close about this aperture in some different path. This path would most likely be through air. This condition represents a very high energy state. Because of this high energy state, when the large magnitude of magnetizing current is reduced to zero, the domains in the common volume will reorient to a lower energy state such that the flux in the common volume is shared by both apertures.

Consequently, a change in flux linkage around one aperture will cause a change in the flux linkage about the other aperture. That is, the change in magnetic intensity associated with the changing amplitude of a current linking the interrogate aperture 101 will cause the domains in the common volume of ferrite to be reoriented momentarily to favor orientation about the interrogate aperture. This reorientation will decrease the flux linking the sense aperture 102 and give rise to an induced voltage on the sense winding 96. This increase in the flux linkage about the interrogate aperture 102 and the corresponding decrease in the flux linkages about the sense aperture 101 is absolute in magnitude and is independent of the direction of flux about the sense aperture 102. Therefore the induced voltage in the sense winding 96 will be positive for one direction of flux about the sense aperture and negative for the other direction of flux about the sense aperture. The above domain reorientation is reversible, that is, no irreversible flux is switched, and when the current in the interrogate aperture 101 is decreased to zero the domains in the common volume will reorient to the original domain configuration.

From the above it will be seen that the Biax units continue to act as linear transformers for AC signals even when there is a remanent flux due to the set or the reset state of the core material. The novel use of the Biax unit in this circuit relies on the fact that when a Biax core is driven (interrogated) by a sinusoidal current through a winding in one aperture, say for example, drive winding 61 which extends through the interrogate aperture 101, then the phase of the sinusoidal voltage appearing in a winding which links through aperture 102, will be either in phase with the current through winding 101, or differ by 180°, depending upon the direction of the residual flux about the sensing aperture. In other words, as indicated in FIG. 6, AC signals from all the channels on either side of channel n, such as channels, n—3, n—2, n—1, n+1 (channel), 2, 3 etc. whose Biax units may be in the reset state will have the same phase as indicated at $X_1$, while the Biax unit for channel n which has been put in the set state by the interrogate pulse in the drive (interrogate) winding will have its output shifted by 180° as indicated at $X_0$. In accordance with the previous description of operation, it is arbitrarily assumed that the phase $X_0$ of the Biax unit in channel n is such as to provide regenerative feedback so that when the output of the channel is through the sense winding of its Biax unit to the input of the Doppler amplifier, as previously described, channel n will operate as an oscillator.

The novel use of the Biax unit as a phase-reversible linear transformer is based on the fact that linear operation is valid only for reversible magnetic domain rotation and breaks down whenever flux switching occurs during interrogation. Consequently, the interrogate aperture shuttle flux voltage can be expressed $$V_{int} = L\frac{di}{dt} \quad (1)$$

where $V_{int}$ is the amplitude of the interrogate voltage. Then the Biax sense winding voltage can be expressed $$V_{sen} = \pm KV_{int} = \pm KL\frac{di}{dt} \quad (2)$$

where K is the transformation or apparent terms ratio and use of the plus or minus sign depends upon the direction of flux about the sensing aperture.

A proper number of turns for the interrogate winding must be determined so that a linear transformer equivalent circuit is valid at all times. That is, the product of the number of turns of the interrogate winding and the magnitude of the interrogate curve must be less than that value which would produce irreversible flux switching. This condition must hold for the worst case combination. This worst case condition would occur when the Biax is at its upper temperature limit, and the Biax is in an oscillating channel. The proper ampere-turn product should lie as close as possible to the value of the ampere-turns where irreversible flux switching occurs in order to obtain sufficient output voltage at the lower temperature limit. This is true because for a given ampere-turn product the output voltage decreases as the temperature decreases. In a practical embodiment of this device it was found that a 10-turn interrogate winding 61 would provide the optimum condition.

As previously mentioned the polarity of the induced voltage appearing on the Biax sense winding is dependent upon the direction of the residual flux about the sense aperture 102. The set state of a Biax may be defined as that state where the direction of flux about the sense aperture is in the direction which produces a polarity of sense voltage which, if closed to the Doppler amplifier input, will cause the amplifier to oscillate. On the other hand the reset state of a Biax element is defined as the state where the direction of flux about the sense aperture is in the direction which produces a polarity of sense voltage which, if closed to the Doppler amplifier input, will not cause the amplifier to oscillate. In other words, the set state is the oscillating state and the reset state is the nonoscillating state. Also in the equation for the voltage induced in the sense winding the plus sign corresponds to the set state and the minus sign corresponds to the reset state.

As far as the state switching function is concerned the Biax element may be considered as a simple ferrite toroid. As is characteristic of all square loop ferrite materials, Biax elements require an increase in current to switch flux states at decreased temperatures. This is true because of the "squaring of the knee" and increase in coercive force at decreased temperatures, and the "rounding of the knee" and decrease in coercive force at elevated temperatures. It would seem that the simple solution to counter the above ferrite characteristics would be to use a sufficient number of turns for the set and reset winding so that state switching would be ensured at the lowest temperature limit. However, there is a limitation to the maximum amplitude of the set and reset magneto motive force since extremely large amplitudes will disturb or erase some of the flux around the interrogate aperture. This would result in a reduction of a Biax output voltage. Because of this fact, the set winding indicated at 81, 82 is a 6-turn winding which links both the interrogate and the sense apertures 101 and 102. Since the set winding links both apertures, the advanced current atempts to saturate both apertures simultaneously. Attempting to saturate both apertures simultaneously ensures equal remanent flux about each aperture for the entire temperature limits. The condition of equal remanent flux about both apertures is the condition for maximum Biax output voltage. The reset winding 63 is a 6-turn winding which links only the sense aperture 102. This is permissible since it is not desired to maximize the reset output voltage, it is only necessary to ensure that it is of the opposite polarity. The sense winding 96 is a 10-turn winding linking the sense aperture 102.

Because of the transient conditions produced in the envelope detection section of the channels a high frequency modulation on the order of several magacycles (for example, approximately 7 mc.) is caused in the sense line voltage. This voltage effects the phase of the summed sense line voltage on conductor 17 which is supplied to the input of the Doppler amplifier to produce the oscillating condition in the channel in which the Doppler signal is located and the Biax element of which is in the set state in accordance with the operation described above. The phase of the summed voltage must be such as to maintain oscillation at the frequency of the channel crystal. A capacitor of appropriate value around the Biax sense line solved the problems produced by these two conditions. The nominal value of this capacitor is chosen such that its capacitance, the sense line inductance and the resistance are series resonant at the midband frequency of the bank of channels associated with the Doppler amplifier. The voltage feedback to the Doppler amplifier input is the voltage developed across this capacitor. The sense line and capacitor are, in effect, a low pass filter; hence, the high frequency voltage components are not developed across the capacitor. Also, there is enhancement of the signal voltage due to the "Q" of the series resonant circuit. The Q is very low in order that the effects of resonance do not vary appreciably over the different channels of the filter bank.

Because of the series resonant nature of the sense line circuit, including the windings 96 of the Biax units, the current that flows in the sense line 17 may lag, lead, or be in phase with the voltage appearing on a Biax element sense winding 96, depending upon the series resonant frequency of the resistance, inductance and capacitance. Also, the voltage across the capacitoir will lag the same line current by 90°. By adusting the value of the capacitor to change the resonant frequency, the voltage feedback to the Doppler amplifier can be made to either lead, lag or be in phase with the interogate current in the interrogate aperture 101. This adjustment changes the frequency of the synthetic Doppler signal. If the adjustment is made such that the frequency in a synthetic Doppler is identical to the midband frequency of the center frequency of the sub-bank, the synthetic Doppler signal frequency for all the channels in the sub-bank will lie in the pass-band of its associated channel.

It will be apparent to those skilled in the art that various changes can be made without departing from the spirit and concept of the invention. Among such variations is the manner in which the channels are changed from passive filter operation to that of an oscillator configuration. For example, a change could be made so that the phase of a Biax sense winding would be changed only if the channel has a threshold signal. Variuos other changes could be made to accommodate different atuomatic operations.

We claim as our invention:

1. Signal data retrieval apparatus for retrieving signal data dispersed in a wide spectrum of frequencies including non-coherent frequencies of random phase and amplitude, comprising
   a source of a wide spectrum of input signals, including the desired signal power spectrum,
   a wide band amplifier normally connected to said source,
   a plurality of signal channels connected to the output of said amplifier and each having a selected bandwidth and being substantially contiguous so that they separate the signal power spectrum into discrete quantized segments, each of said channels including a crystal and a tuned circuit serving as a bandpass filter for a selected band of frequencies;
   a plurality of means for inductively coupling the output of each channel to the input of said amplifier, one such means being provided for each channel;
   and means for selectively reversing the phase of one of said coupling means to thereby change a circuit configuration including said amplifier and one of said signal channels from that of an amplifier to that of an oscillator.

2. The combination as set forth in claim 1 plus means responsive to a signal of an amplitude above a selected threshold value for changing the phase of one of said inductive coupling means.

3. The combination as set forth in claim 2 plus means also responsive to said threshold signal for disconnecting the input of said amplifier from said source of wide spectrum input signals.

4. The combination as set forth in claim 1 in which the outputs of said plurality of inductive coupling means are connected in a series circuit.

5. The combination as set forth in claim 4 plus signal sampling means and means for selectively connecting the output of each channel sequentially to said signal sampling means.

6. The combination as set forth in claim 6, plus means responsive to a signal above a selected threshold for regeneratively coupling the output of one of said channels to the input of said amplifier.

7. The combination as set forth in claim 1 in which said inductive coupling means is a linear transformer having a square loop core whose remanent flux can be latched in either of two opposite directions.

8. The combination as set forth in claim 7 in which the transformer core is provided with two non-intersecting apertures with the volume of the core material between the apertures receiving magnetic flux induced around each aperture so that the flux linkage around one aperture will cause a change in the flux linkage around the other hole, and a primary winding connected to the output of a channel linking through one aperture and the secondary winding linking the other aperture.

References Cited

UNITED STATES PATENTS

| | | | |
|---|---|---|---|
| 3,149,333 | 9/1964 | Campbell | 343—8 |
| 3,181,149 | 4/1965 | Weinberg et al. | 343—8 |
| 3,417,397 | 12/1968 | List et al. | 343—8 |

ROBERT L. GRIFFIN, Primary Examiner

ALBERT J. MAYER, Assisetant Examiner

U.S. Cl. X.R.

343—8